G. T. LEE.
TIRE SHADE.
APPLICATION FILED MAR. 7, 1921.
1,401,088.
Patented Dec. 20, 1921.
2 SHEETS—SHEET 1.
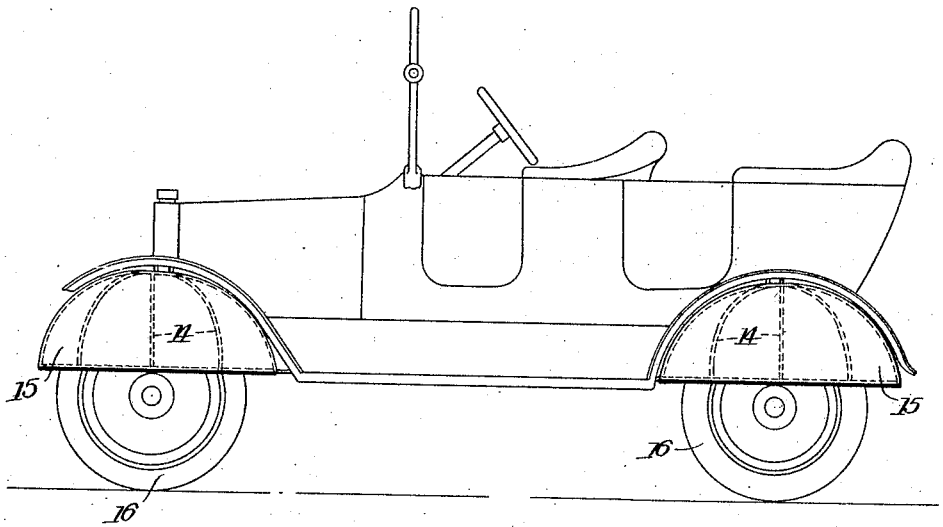
Fig. 1.
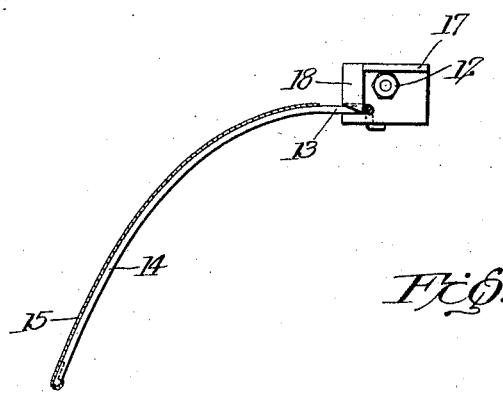
Fig. 2.
Fig. 3.
George T. Lee,
INVENTOR
BY Victor J. Evans
ATTORNEY
WITNESS:

G. T. LEE.
TIRE SHADE.
APPLICATION FILED MAR. 7, 1921.

1,401,088. Patented Dec. 20, 1921.
2 SHEETS—SHEET 2.

George T. Lee,
INVENTOR

BY Victor J. Evans
ATTORNEY

UNITED STATES PATENT OFFICE.

GEORGE T. LEE, OF GLYNDON, MINNESOTA.

TIRE-SHADE.

1,401,088. Specification of Letters Patent. Patented Dec. 20, 1921.

Application filed March 7, 1921. Serial No. 450,217.

*To all whom it may concern:*

Be it known that I, GEORGE T. LEE, a citizen of the United States, residing at Glyndon, in the county of Clay and State of Minnesota, have invented new and useful Improvements in Tire-Shades, of which the following is a specification.

This invention comprehends the provision of a shade designed to protect automobile tires and the like from the heat of the sun rays, when the vehicle is left standing for an appreciable length of time, thus protecting the tires to prolong their life, as well as guarding against blow-outs which frequently result from overheated tires.

The chief characteristic of the present invention resides in providing a shade of the above mentioned character, which can be secured to an appropriate part of the vehicle, the shade being foldable so as to occupy a minimum space when not in use, means being provided to hold the shade folded while the vehicle is not in use.

The nature and advantages of the invention will be better understood when read in connection with the accompanying drawings, the invention residing in the combination, construction and arrangement of parts as claimed.

In the drawings forming part of this application, like numerals of reference indicate similar parts in the several views and wherein:

Figure 1 is a side elevation of the improvement applied to the mud guards of a motor vehicle.

Fig. 2 is a detail view of the bracket and showing the shade in section.

Fig. 5 is a detail view of the bolt used to support the device beneath the fender of a motor vehicle.

Figure 3:
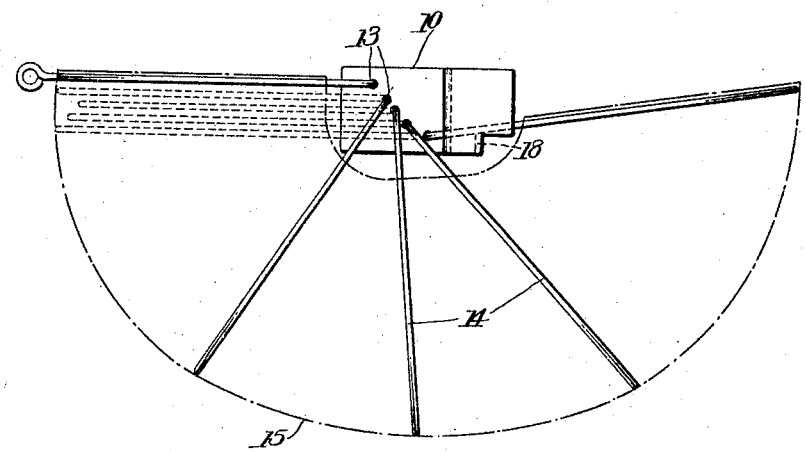
Fig. 3 is a top plan view of the swinging elements in open position.
Figure 4:
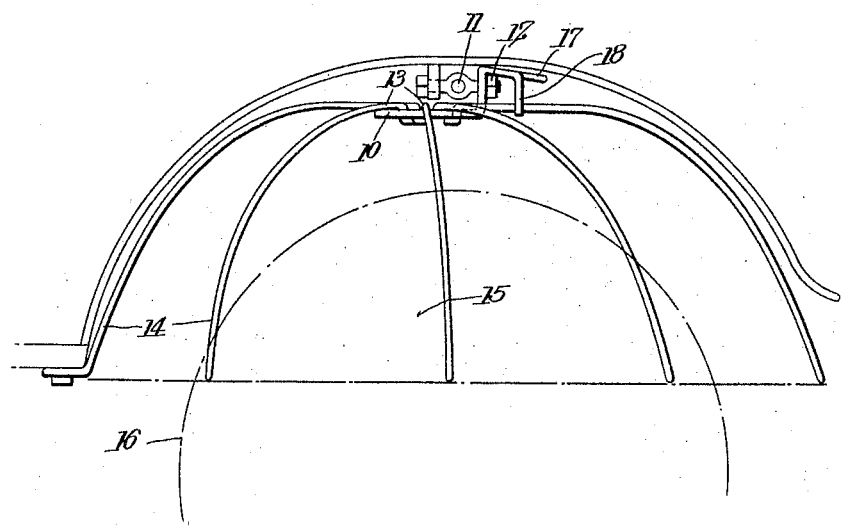
Fig. 4 is a side elevation thereof.

Before entering into a detail description of the shade forming the subject matter of my invention, I wish to state that there is one of such shades used in conection with each wheel of the vehicle as illustrated, and as all of the shades are substantially of the same construction, a brief description of one will suffice for all.

The shade comprises a bracket or support 10 which is secured to one of the fender supports 11 of the vehicle as at 12. Pivoted on the bracket 10 are the corresponding extremities 13 of a plurality of wire elements 14 which have stitched or otherwise suitably secured thereto the flexible material 15 constituting the shade proper. The elements 14 are of different lengths and of a proper number to afford the shade a configuration to cover approximately the upper half of the tire 16, thereby protecting the latter from the heat of the sun rays when the shade is extended for use as illustrated in the drawings. Projecting from the bracket 10 is an extension 17 which has associated therewith a catch 18 adapted to engage the adjacent element 14 to hold the shade in its entirety in position for use. It is of course understood that it is used to protect the tire only when the vehicle is standing idle, and when the vehicle is in use the shades are folded by swinging the elements 14 upon the bracket 10 into parallelism as shown, in which instance the straps 14 are used to hold the shade folded. By reason of the fact that the shade is arranged beneath the fender it does not detract from the appearance of the car when the shades are folded. The invention is not only simple in construction, but can be easily attached to any make of vehicle, and can also vary in size and configuration without departing from the spirit of the invention.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

A tire shade for motor vehicles or the like comprising a bracket removably secured to the fender support of the motor vehicle and provided with a plurality of openings, a plurality of curved wire elements provided with off set ends extending through said openings, a flexible cover connecting said elements, an extension projecting downwardly from said bracket and adapted to engage the covering of one of said wire elements and means for holding the wire elements in folded position.

In testimony whereof I affix my signature.

GEORGE T. LEE.